United States Patent [19]

Dhar

[11] Patent Number: 5,140,905
[45] Date of Patent: Aug. 25, 1992

[54] STABILIZING GAS BEARING IN FREE PISTON MACHINES

[75] Inventor: Manmohan Dhar, Schenectaday, N.Y.

[73] Assignee: Mechanical Technology Incorporated, Latham, N.Y.

[21] Appl. No.: 621,365

[22] Filed: Nov. 30, 1990

[51] Int. Cl.5 .............................................. F15B 21/04
[52] U.S. Cl. .................................. 92/82; 92/86.5; 92/159; 92/160; 92/162 R; 277/3; 277/28; 60/517
[58] Field of Search ............... 92/82, 83, 86.5, 127, 92/153, 154, 156, 158, 159, 160, 162 R; 60/517, 518, 520; 277/3, 28, 29, 70

[56] References Cited

U.S. PATENT DOCUMENTS

| | | | |
|---|---|---|---|
| 3,364,675 | 1/1968 | Dorer | 92/162 R |
| 3,777,722 | 12/1973 | Lenger | 92/86.5 |
| 4,245,844 | 1/1981 | Pohl et al. | 277/3 |
| 4,304,410 | 12/1981 | Erickson et al. | 92/162 R |
| 4,474,106 | 10/1984 | Durenec | 92/159 |
| 4,545,738 | 10/1985 | Young | 92/127 |
| 4,623,151 | 11/1986 | Kashiwamura et al. | 277/28 |
| 4,644,851 | 2/1987 | Young | 92/127 |
| 4,802,332 | 2/1989 | Beale | 60/520 |

FOREIGN PATENT DOCUMENTS

| | | | |
|---|---|---|---|
| 0212861 | 3/1987 | European Pat. Off. | 60/517 |
| 3023660 | 1/1982 | Fed. Rep. of Germany | 92/86.5 |

Primary Examiner—Thomas E. Denion
Attorney, Agent, or Firm—Kane, Dalsimer, Sullivan, Kurucz, Levy, Eisele and Richard

[57] ABSTRACT

In a free piston engine, to reduce dynamic loads on the reciprocating elements caused by a time varying pressure gradient across the gas bearing and close clearance seals provided therein, drain galleries are incorporated at the ends of the gas bearings to isolate the same, and circumferentially spaced grooves are incorporated in the close clearance seal region.

6 Claims, 4 Drawing Sheets

STABILIZING GAS BEARING IN FREE PISTON MACHINES

This invention was made with Government support under Contract NAS3-25463 awarded by NASA. The Government has certain rights in this invention.

FIELD OF INVENTION

The present invention relates to a gas bearing for use in machines operating in a free piston arrangement.

BACKGROUND OF THE INVENTION

The use of free piston arrangements in various types of engines particularly Stirling type engines is well known. The basic design involves the use of a displacer and a power piston. Typically, the displacer is positioned in a cylinder defining expansion and compression chambers. Coupled between these chambers may be a heat exchanger through which gas passes. For example, in a refrigeration setting the displacer on which a mechanical reciprocal movement is imparted, reciprocates between upper and lower points. At the lower point compressed gas is admitted into the compression chamber which is then compressed upon movement of the displacer. The gas then passes through the heat exchanger where the gas exchanges heat with it and into the expansion space where it undergoes adiabatic expansion which decreases its temperature. When the displacer moves down, the gas in the expansion chamber is forced through the heat exchanger, removing heat therefrom. The cycle then repeats itself continually to produce a heat sink.

Generally speaking the purpose of the displacer is to transfer engine working gas from hot volume to the cold volume and back during engine operation. The purpose of the power piston is alternately to compress and expand engine working gas, and transfer the resulting mechanical power to a suitable load. Both the displacer and the power piston are connected to gas springs. The purpose of the gas springs is to provide reactive power flow required alternately to accelerate and decelerate these reciprocating elements. Pressure waves in the gas spring are isolated from the engine pressure wave by close clearance seals. These pressure waves are not however in phase with each other. Therefore, a time varying pressure gradient exists across the reciprocating elements which are generally supported on gas bearings.

A time varying pressure gradient across the gas bearings can result in a large oscillation of the bearing journal. Time varying pressure gradient across the gas bearing of a free-piston machine and close clearance seals can also impose significant dynamic forces and moments on the reciprocating elements. Pressure gradient in the clearance seals affects engine performance due to power loss associated with the seal leakage. It also affects the dynamic behavior of the reciprocating elements by imposing time varying force and moment.

For a given pressure differential and seal radial clearance, leakage power loss is inversely proportional to the seal length and the dynamic load is directly proportional to the square of the seal length. Therefore, from engine performance considerations the seal length needs to be large, and from the bearing consideration (which carries the dynamic loads) the seal length needs to be short.

Accordingly, there exists a need to reduce the dynamic loads on the elements without impacting the engines performance.

SUMMARY OF THE INVENTION

It is an object of the invention to reduce the dynamic loads and moments on the reciprocating elements of a free piston engine.

It is a further object of the invention to reduce such dynamic loads and moments without impacting on the engines performance.

A further object of the invention is to allow for a reduction in dynamic loads without significantly reducing the seal length.

These objects are met by the present invention by isolating the gas bearing from the oscillating pressure in the engine working space and gas spring pressure waves by incorporating mean pressure drain galleries at the bearing ends. These drain galleries are connected to a mean pressure volume in the engine structure.

In addition, the present invention provides for circumferential grooves in the close clearance seal region the number of which depends on the magnitude of the pressure gradient. The grooves can be provided on either the cylinder or on the reciprocating piston. The optimum groove dimensions depend upon the operating parameters (reciprocating frequency, pressure gradient, and seal geometry). In general, however, the volume of the groove should be large enough to ensure uniform pressure around the circumference of the groove. The volume of the groove should also be small enough to ensure that the time constant to fill the groove is a small fraction of the time period of the reciprocating elements.

BRIEF DESCRIPTION OF THE DRAWINGS

Thus by the present invention its objects and advantages will be realized, the description of which should be taken in conjunction with the drawings, wherein.

DETAILED DESCRIPTION OF THE PREFERRED EMBODIMENT

Initially, basic Stirling engine design and application is set forth in *Stirling Engines* by G. Walker, Clarendon Press, 1980. In the basic operation a free piston engine has two reciprocating elements, a displacer and a power piston. In a long life Stirling engine these reciprocating elements are supported on gas bearings.

Figure 1:
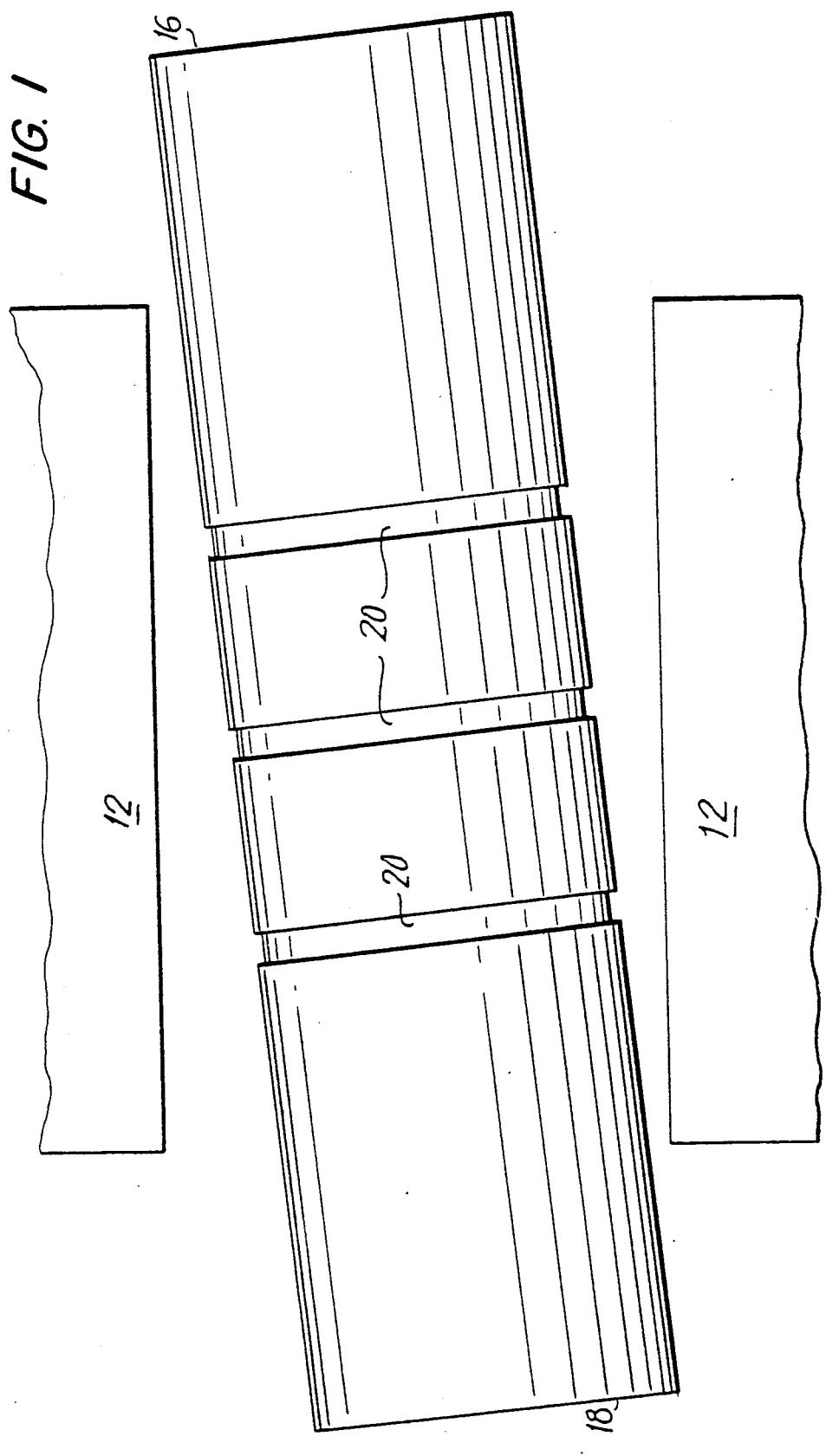
FIG. 1 is a schematic new of a tilted piston having circumferential grooves.

FIG. 1 is for purposes of illustration. A piston or displacer 10 is disposed in a free piston engine generally indicated by cylinder or chamber 12. The piston 10 is shown tilted with respect to the cylinder wall and in the space therebetween 14. The space is exaggerated since it is normally on the order of ten thousandths of an inch.

Positioned at one end 16 of the piston 10 may be a gas spring and at the opposite end 18 a working or compression space. As aforesaid, the purpose of the displacer is to transfer engine working gas from hot volume to the cold volume and back during engine operation. The purpose of the power piston is alternately to compress and expand engine working gas with the gas springs providing reactive power flow to accelerate and decelerate the reciprocating elements. Pressure waves in the gas spring are normally isolated from the engine pressure wave by close clearance seals. These pressure waves are not in phase with each other. Therefore, a time varying pressure gradient exists across the clearance seals.

Depending upon the pressure gradient a number of circumferential grooves 20 are provided either on the piston 10 as shown or on the cylinder 12 in the close seal area. The volume of the grooves should be large enough to ensure a uniform pressure around the circumference of the groove yet small enough to allow the filling thereof to be fraction of the period of the reciprocating element.

Figure 2:
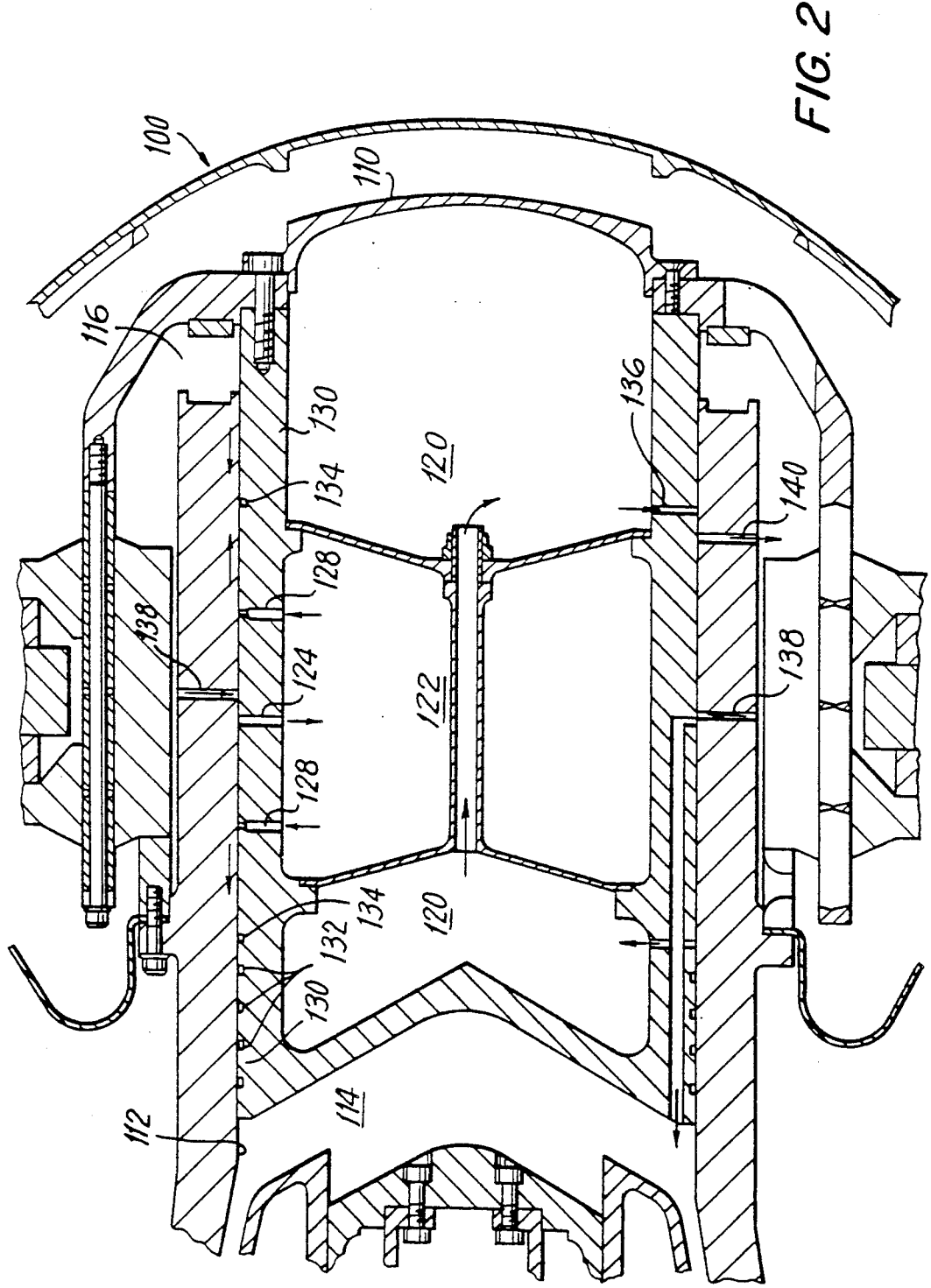
FIG. 2 is a sectional view of a hydrostatic power piston in a free piston engine, incorporating the teachings of the present invention.
Figure 3:
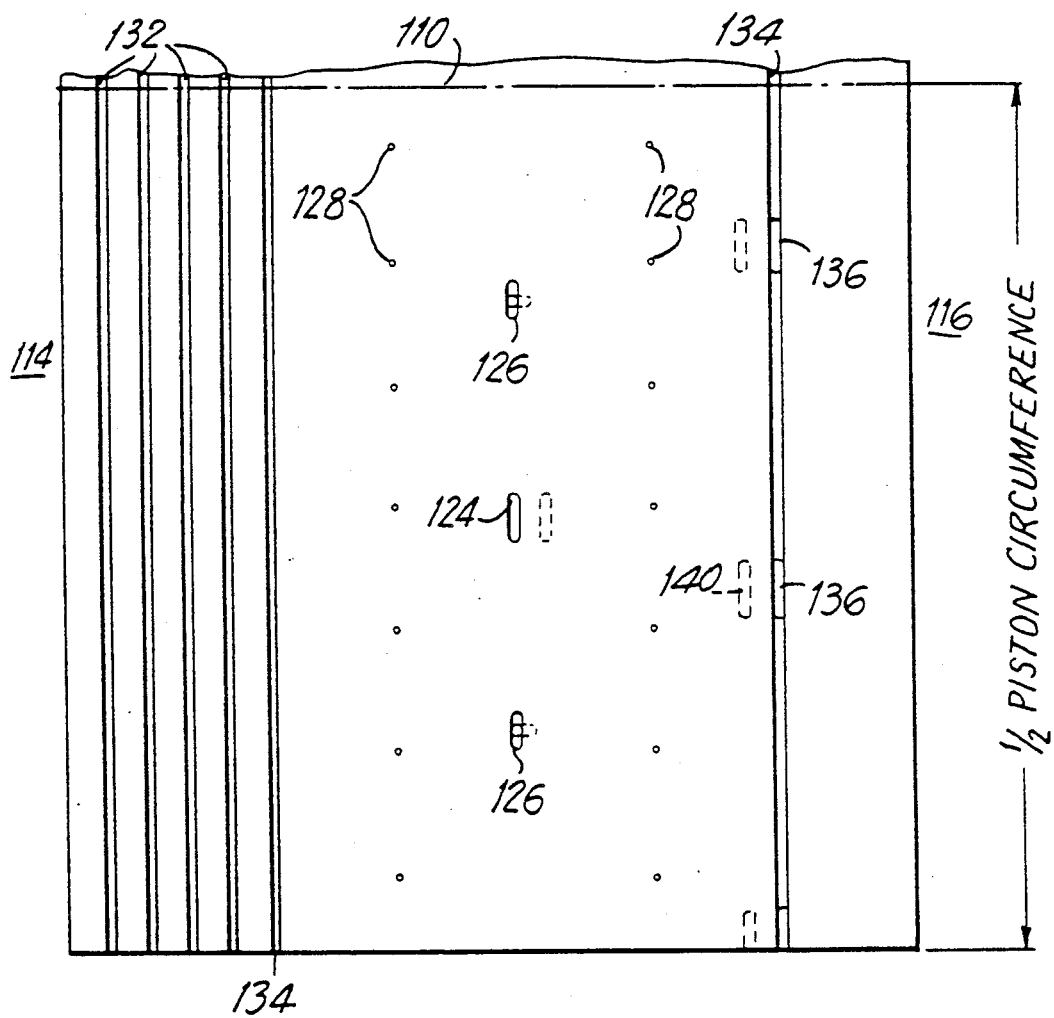
FIG. 3 is a perspective view of a hydrostatic power piston incorporating the teachings of the present invention.

Turning now to FIGS. 2 and 3 there is shown for illustration a piston of a free piston engine 100 showing a hydrostatic power piston 110. The piston 110 is contained within cylindrical wall 112 and reciprocates between compression space 114 and a gas spring space 116. A portion of a displacer 118 is shown on the opposite side of the compression space 114. The power plenum 110 initially includes a drain plenum 120 along with a supply plenum 122.

Power piston 110 includes a supply port 124, midstroke port 126 along with gas bearing feed holes 128. Positioned on opposite ends of the piston 110 are seal areas 130. Note, that seal clearance is normally on the order of ten thousandths of an inch. Positioned on the forward end of the piston 110 is a plurality of circumferential grooves 132. As aforesaid, the number of grooves and their volume will depend upon the pressure grade across the piston and the desired result.

Also, provided on the piston 110 are drain grooves 134 including drain ports 136. Located in the cylinder wall are ports (Pgs) 138 and drain ports 140 with the arrows in FIG. 2 showing the respective flows.

As can be seen, the gas bearing is isolated from the oscillating pressure (compression space and gas spring) by the mean pressure drain galleries at opposite sides thereof comprising the drain grooves 134 and drain plenum 120. In addition, the equally spaced circumferential grooves 132 serve to reduce the dynamic load without significantly reducing the seal length. As aforesaid, the optimum groove dimension depend upon the operating parameters (reciprocating frequency, pressure gradient and seal geometry). However, the volume of the groove should provide uniform pressure, yet be small enough to ensure the time constant to fill the groove is a small fraction of the time period of the reciprocating elements.

Figure 4:
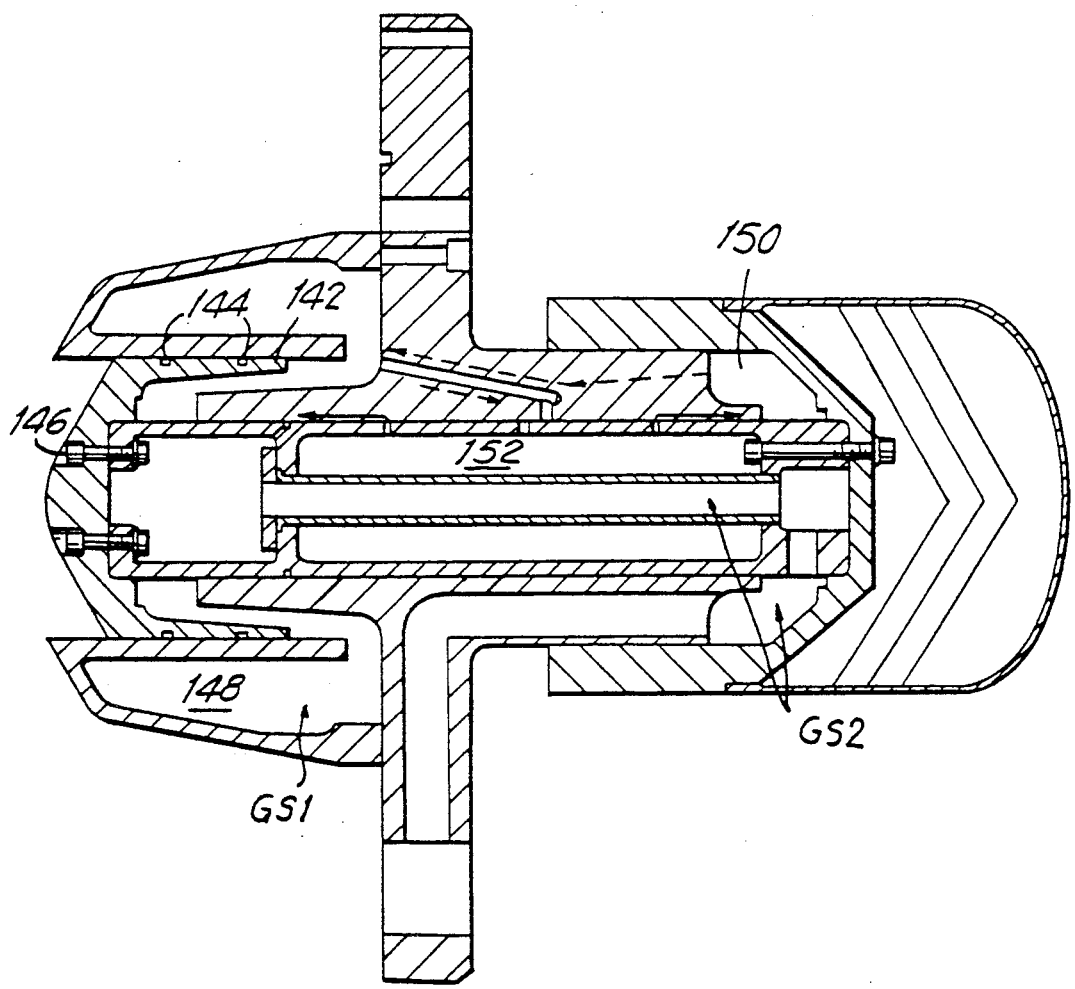
FIG. 4 is a sectional view of a displacer in a free piston engine showing bearing geometry and flow, incorporating the teachings of the present invention.

In FIG. 4, there is shown for illustration a hydrostatic displacer bearing geometry and flows. In this regard, the displacer 142 is provided with circumferential grooves 144 in the seal area adjacent the working or compression space 146. Two gas springs are provided 148 and 150 along with a bearing plenum 152. The purpose of this illustration is to show the grooves on the displacer portion of the free piston engine. Note, that as aforesaid the groove may also be provided upon the cylinder surface rather than the displacer.

Thus by the present invention, its objects and advantages are realized and although a preferred embodiment has been disclosed and described in detail herein, its scope should not be limited thereby rather its scope should be determined by that of the appended claims.

What is claimed is:

1. A free piston machine comprising:
   reciprocal element;
   cylinder means in which said reciprocal element reciprocates;
   gas bearing means disposed between said reciprocal element and said cylinder means;
   pressure gradient across said reciprocal element and said gas bearing means; and
   isolating means comprising drain galleries disposed about the reciprocal element at opposite ends of the gas bearing means for isolating said gas bearing means from the effect of the pressure gradient and stabilizing the movement of the reciprocal element.

2. The invention in accordance with claim 1 wherein said reciprocal element comprises a power piston or displacer.

3. The invention in accordance with claim 2 wherein said drain galleries include drain grooves disposed about said reciprocal element and coupled to a mean pressure volume within the machine.

4. The invention in accordance with claim 3 which includes sealing means disposed in a sealing area positioned between the cylinder means and the reciprocal element, said pressure gradient being disposed across said sealing means, and circumferential grooves disposed in said sealing area which reduce dynamic loading thereon and stabilize the movement of the reciprocal element.

5. The invention in accordance with claim 4 wherein the volume of the grooves is a factor of providing uniform pressure around the groove and the period of reciprocation of the reciprocal element.

6. The invention in accordance with claim 5 wherein the grooves are positioned on the reciprocal element.

* * * * *